Feb. 19, 1963 W. E. SCHAUER 3,078,133
PIVOTALLY AND VERTICALLY MOVABLE SHELF STRUCTURE
Filed Nov. 13, 1956 6 Sheets-Sheet 1

INVENTOR.
WILBERT E. SCHAUER
BY
Wheeler, Wheeler & Wheeler
ATTORNEYS

Feb. 19, 1963 W. E. SCHAUER 3,078,133
PIVOTALLY AND VERTICALLY MOVABLE SHELF STRUCTURE
Filed Nov. 13, 1956 6 Sheets-Sheet 2

INVENTOR.
WILBERT E. SCHAUER
BY
Wheeler, Wheeler & Wheeler
ATTORNEYS

Feb. 19, 1963 W. E. SCHAUER 3,078,133
PIVOTALLY AND VERTICALLY MOVABLE SHELF STRUCTURE
Filed Nov. 13, 1956 6 Sheets-Sheet 4

INVENTOR.
WILBERT E. SCHAUER
BY
Wheeler, Wheeler & Wheeler
ATTORNEYS

INVENTOR.
WILBERT E. SCHAUER
BY
Wheeler, Wheeler & Wheeler
ATTORNEYS

United States Patent Office 3,078,133
Patented Feb. 19, 1963

3,078,133
PIVOTALLY AND VERTICALLY MOVABLE
SHELF STRUCTURE
Wilbert E. Schauer, 926 Spaight St., Madison 3, Wis.
Filed Nov. 13, 1956, Ser. No. 621,713
21 Claims. (Cl. 312—223)

This invention relates to storage devices and more particularly to shelves which are movable from relatively inaccessible stored position within said devices to relatively accessible positions clear of said devices.

In storage areas, for example, residential kitchens, libraries, parts warehouses, retail mercantile establishments such as drug stores, etc., room space above a height conveniently accessible is not normally provided with shelves because of the difficulty in reaching such space without the assistance of a ladder, etc. Where such shelves are provided they are frequently unused and do not effectively add to the total storage space available. In residences, particularly in the kitchen, bedroom, closets, etc., both high and low wall space is generally inaccessible to older and infirm people.

It is the object of the present invention to provide both open and closed shelf structures in which certain shelves are movable from relatively inaccessible stored position to relatively accessible position. In the preferred embodiments of the invention the movable shelves are power operated.

Figures 1, 2:
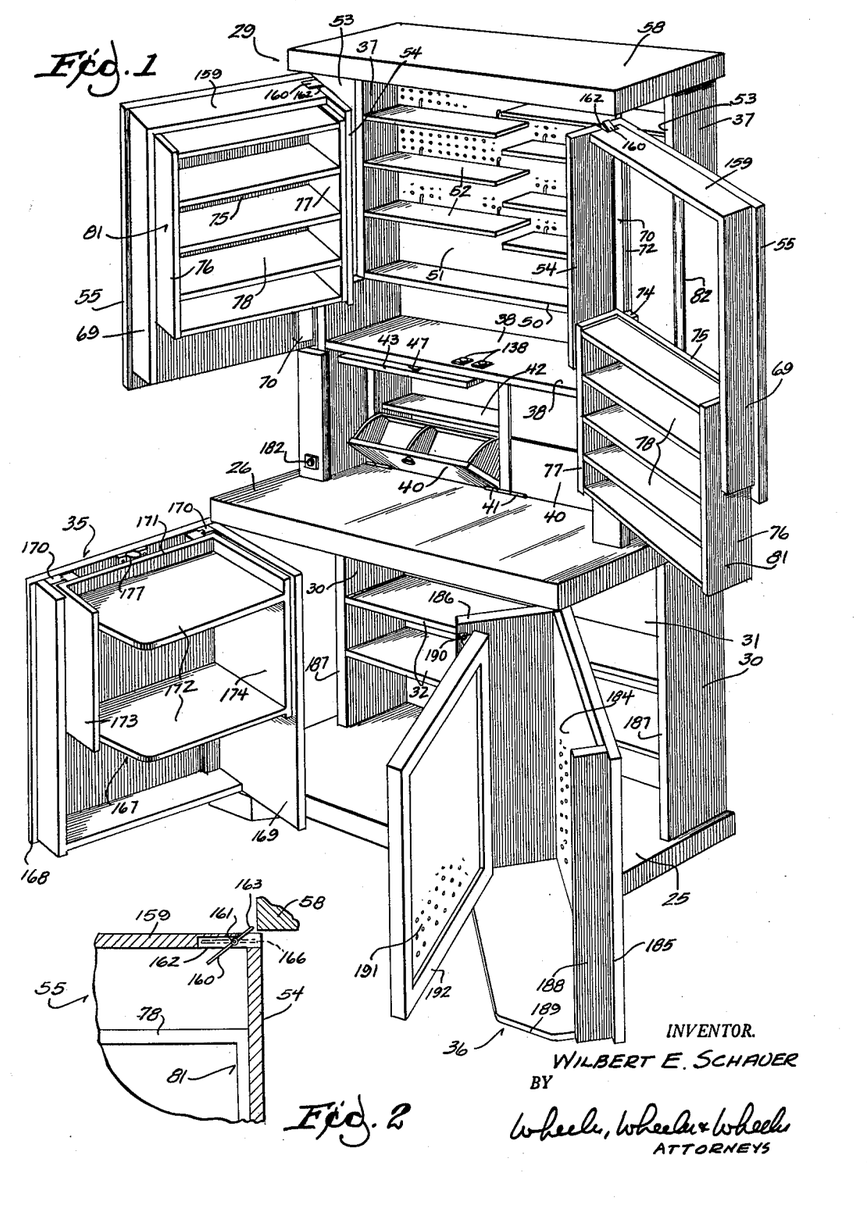
FIG. 1 is a perspective view of a kitchen cabinet embodying my invention, the various doors being shown in open position to expose and illustrate details of the invention.
FIG. 2 is a fragmentary cross sectional view taken through a door embodying my invention and disclosing a gravity operated stop.

In the embodiment of the invention shown in FIG. 1, a kitchen or other storage cabinet of conventional external appearance comprises a base 25 and a counter 26. The cabinet is divided by the counter into a top cupboard 29 and a storage space below the counter. The rear of the cabinet is closed by a back wall 27 which may be upwardly extended at 29 to provide a back wall for the cupboard 29 which extends above the level of the counter 26. Below the counter the cabinet has side walls 30 which are set back from the forward margin of the counter 26. Rear wall 27 is desirably provided with a conventional pegboard lining 31 on which storage shelves 32 may be supported at selected convenient levels. The cabinet back may be left open.

The lower portion of the cabinet is further provided with swinging door structures 35 and 36 as hereinafter described.

The cabinet portion 29 above the level of the counter 26 may be provided with side walls 37 and a cross shelf 38 below which I may provide various convenient storage compartments such as at 39 which receives the compartmented bin 40 pivotally connected at 41 to the counter top 26. The bin 40 may receive cutlery and other small kitchen utensils.

The top of compartment 39 is defined by the cross shelf 42 which may receive canister sets or the like, a door 43 therefore being hinged to the undersurface of shelf 38 on hinges 44. The handle 47 of door 43 is desirably fabricated of magnetic material and is aligned with the magnet 48 recessed in shelf 38 whereby the door will be impositively held in raised position when opened.

The shelf 38 provides for storage of relatively large articles. Another cross shelf 50 extends across the rear of the cabinet 29 at a convenient level above shelf 38. Cabinet back 27 above the level of shelf 50 is provided with a pegboard lining 51 on which a variety of narrow shelves 52 may be hung in the conventional manner. Shelf 50 and shelves 52 are narrower than cross shelf 38, desirably being about only one-half or less than one-half of the total depth of cabinet 29. Inasmuch as shelves 52 are relatively inaccessible to a person standing on the floor in front of the cabinet, they are intended to receive and store articles having a limited use. The cabinet space in front of shelves 52 is utilized for storage of more actively used articles on my elevator shelf structures 81 hereinafter described.

Figure 4:
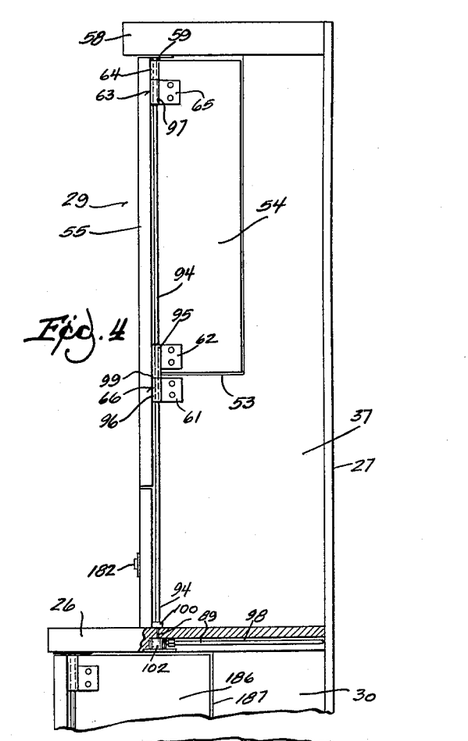
FIG. 4 is a fragmentary side elevation of the device of FIG. 3, portions being broken away and shown in cross section to expose details of construction.

Both side walls 37 of cabinet 29 are cut out at 53 to receive the side walls 54 of the swinging doors 55. The top 58 of the cabinet extends forwardly to overhang the cut-out portions 53 of side walls 37. At each front corner the underside of top 58 is provided with a bracket 59 having a depending socket 64 aligned with hinge tube 94 journaled therein. Hinge tube 94 is fixed to the eyes 95 and 97 of hinges 66 and 63 respectively having leaves 62, 65 connected to the door side wall 54. Below the level of cut-out 53 hinge tube 94 turns in eye 96 of hinge 66 which has a leaf 61 connected to wall 37. The door 55 and associated apparatus is supported on the bearing surface 99 between eyes 95, 96 (see FIG. 4).

Figure 5:
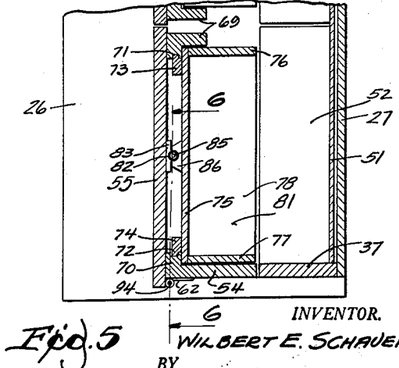
FIG. 5 is a fragmentary cross sectional view taken along the line 5—5 of FIG. 3.

As best shown in FIG. 5, door 55 at its side margin opposite the pivot tube 94 is provided with a guide strip 69. Side wall 54 is provided with a guide strip 70, the respective guide strips 69, 70 being undercut at 71, 72 to provide guideway slots in which the tongues of guide rails 73, 74 are vertically slidable. The guide rails 73, 74 support the back wall 75 of a shelf structure 81 having sides 76, 77 and a series of cross shelves 78.

Figure 3:
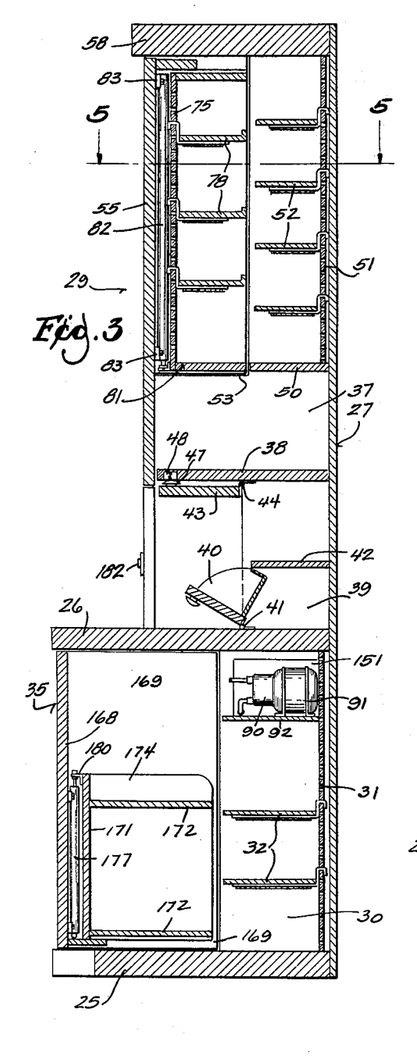
FIG. 3 is a vertical cross section taken through the device of FIG. 1, all doors being closed.

Each shelf structure 81 is mounted for bodily movement between a relatively inaccessible stored position within the cabinet, as shown in FIG. 3, and relatively accessible exposed positions, as shown in FIG. 1. When shelf structure 81 is lowered to its full extent, as shown toward the right in FIG. 1, the contents of shelves 78 are within easy reach of a person standing in front of the cabinet. The contents of lowered shelf structure 81 are particularly accessible because the door 55 is swung out into the room space forwardly of cabinet 29. Because of the pivotal mounting of the door 55 it may be positioned to clear any object on the counter 26 before the shelf structure 81 is lowered. Accordingly, nothing on the counter 26 nor in the cabinet 29 need be disturbed in the process of bringing the shelf structure 81 to accessible position.

Figure 6:
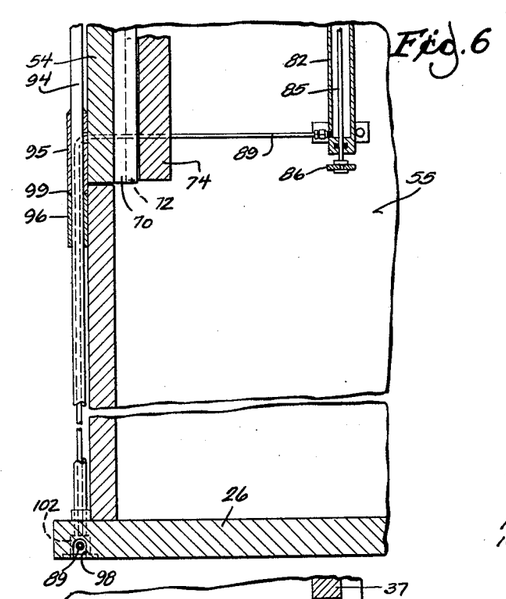
FIG. 6 is a fragmentary cross sectional view taken along the line 6—6 of FIG. 5.
Figure 7:
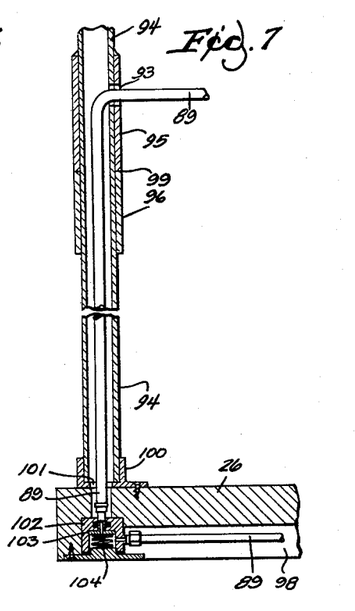
FIG. 7 is a greatly enlarged vertical cross section taken through a hinge tube used in certain embodiments of my invention.

In the embodiment of the invention shown in FIG. 1, I desirably motorize the movement of shelf structure 81. For this purpose I provide the inner face of each door 55 with a hydraulic motor cylinder 82 connected thereto by brackets 83. As best shown in FIGS. 6 and 5, cylinder 82 has a piston 84 connected by means of its piston rod 85 to a bracket 86 connected to the rear wall 75 of the shelf structure 81. Each cylinder 82 is pressurized by its own fluid line 89 connected through appropriate valves 105 to the hydraulic pump 90 shown in FIGS. 3, 21 and 22. The pump 90 and its motor 91 and all other component parts of the hydraulic system may be physically located remote from the cabinet. For the purpose of this disclosure, however, its location is shown in FIG. 3 on a shelf 92 in the base of the cabinet.

The hydraulic line 89 may be of rubber or copper tubing or the like and desirably extends laterally from cylinder 85 through aligned openings 93 in the wall of hinge tube 94 and hinge eye 95.

The bottom end of hinge tube 94 is rotatable in the bearing cup 100 which is mounted on the upper surface of counter 26. Bearing cup 100 is provided with an opening 101 through which the hydraulic line 89 extends for rotatable connection with a swivel hydraulic line connector 102 which has a lateral supply line 89 connected thereto. Lateral line 89 is disposed in passage 98 formed in counter 26. The swivel coupling 102 may not be needed in the event the hydraulic line 89 is of rubber and inherently resilient to permit flexing of its portion within tube 94. However, if a relatively inflexible line is used the swivel coupling may be needed. Its construction is conventional and includes a sealing member 103 biased by the spring 104 against the wall of the cavity through which the line 89 enters.

In the foregoing structure the hydraulic line 89 is coaxial with the axis about which the door 55 swings. Accordingly, line 89 is subject only to torsion as door 55 pivots about its axis. Moreover, line 89 is protected by the hinge tube 94 where it would otherwise be exposed.

Figure 21:
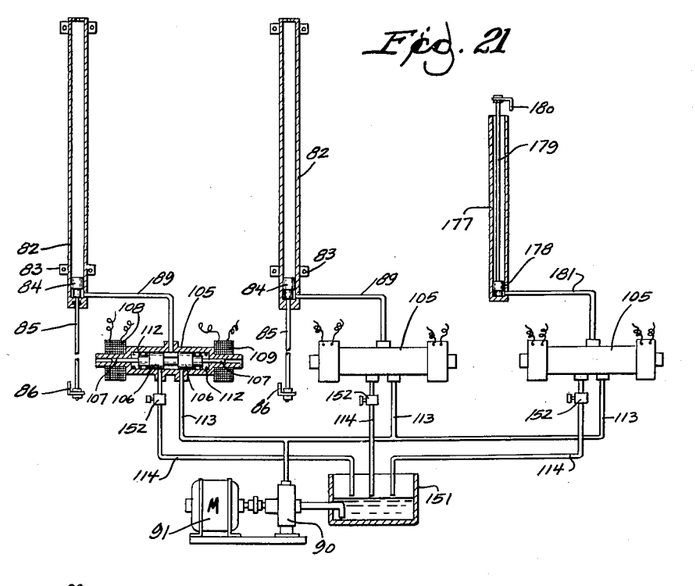
FIG. 21 is a diagrammatic representation of the hydraulic fluid motor, associated connections and hydraulic circuit for use in the device of FIG. 1.

As best shown in FIG. 21, in which hydraulic cylinders 82 for both doors 55 are shown, the lines 89 are supplied with hydraulic fluid through double acting solenoid operated hydraulic valves 105. The construction of these valves is conventional. A schematic circuit diagram by which the valves are operated is shown by way of exemplification in FIG. 22. Each valve 105 comprises an armature 107 having spaced valve spools 106 mounted thereon, the ends of the armature 107 extending axially beyond the valve housing 105 and through the eyes of solenoid windings 108, 109.

The armature is biased to the intermediate position shown in FIG. 21 by the dual opposed coil springs 112 mounted in the valve housing 105. In this position of the armature the respective spools 106 block valve housing ducts which communicate with the main hydraulic pressure line 113 and the relief line 114. Accordingly, in the intermediate or neutral position of valve 105 passage of hydraulic fluid through the valve is precluded and the piston 84 will be positively locked in position in the cylinder 82.

Figure 22:
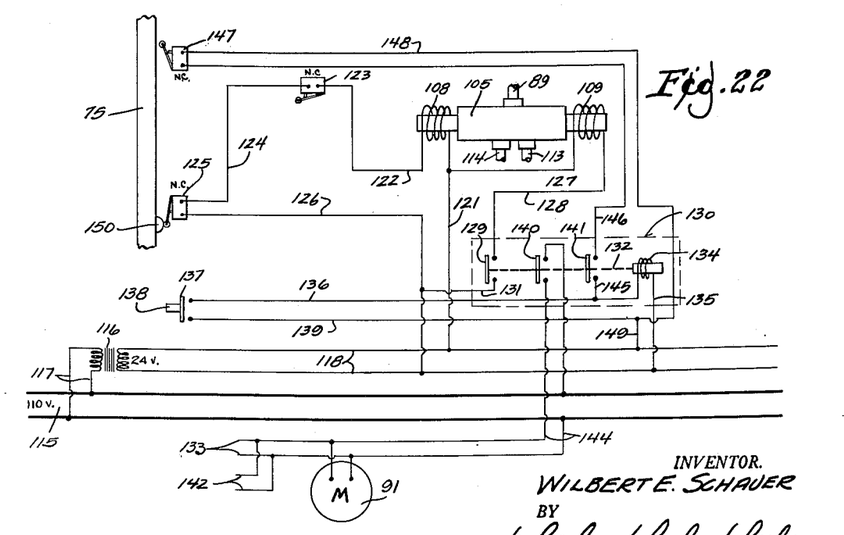
FIG. 22 is a schematic electrical wiring diagram for the apparatus shown in FIG. 21.

Referring now to the electrical circuit diagram of FIG. 22, I illustrate electrical means for operating one valve 105. Each valve 105 will be supplied with a like circuit. A one hundred and ten volt power line is illustrated at 115, a twenty-four volt transformer 116 being connected to the line 115 by leads 117. The secondary winding of the transformer is connected by leads 118 to solenoid winding 108 through the line 121, line 122 which includes a normally closed switch 123 also shown in FIGS. 8–10, line 124, normally closed switch 125 and line 126.

The transformer secondary is also connected to solenoid 109 by line 121, line 127, line 128 through contactor 129 of relay 130 and line 131 to line 126. The armature 132 of holding relay 130 is provided with a solenoid winding 134 connected to the transformer secondary by line 135, line 136, contactor 137 of a manually operated push button 138, line 139 and line 149. Inasmuch as contactor 137 is in series with the solenoid coil 134 push button 138 must be closed in order to energize winding 134 to close the various contactors of relay 130. Push button 138 may be located in the shelf 38 as suggested in FIG. 1.

In order to raise shelf structure 81 from its lowermost position to uppermost position, push button 138 is depressed, thereby closing contactor 137 and completing a power circuit to solenoid 134. Solenoid 134 then shifts armature 132 to close all of the contactors 129, 140 and 141 mounted thereon. Contactor 140 is in series with the lines 144 which operate motor 91 for the pump 90. Lines 133, 142 are in parallel with line 144 and lead from motor 91 to like electric circuits for the other valves 105.

Contactor 141 completes a holding circuit for solenoid coil 134 through lines 145, 146, normally closed upper limit switch 147, line 148 and line 149 to the power circuit leads 118. Accordingly, as long as upper limit switch 147 is closed the armature 132 of the holding switch will remain closed even though the direct circuit through the contactor 137 of push button 138 is open by release of manual pressure thereagainst.

Closure of contactor 129 as aforesaid will energize the solenoid winding 109 to pull the valve spool armature 107 toward the right as shown in FIG. 21 and admit pressurized hydraulic fluid from the pressure line 113 through the valve cavity and into the hydraulic line 89. The pressurized hydraulic fluid will thus lift the piston 84 of the appropriate hydraulic cylinder and lift the shelf structure 81 attached thereto. As soon as the shelf structure reaches its uppermost position a cam 150 mounted on the rear wall 75 thereof will actuate normally closed switch 147 to open said switch, thus breaking the holding circuit to the solenoid 134. Contactor 129 will then open and winding 109 of the valve 105 will be de-energized. Thereupon the coil springs 112 will restore the valve spools 106 to intermediate neutral position and the hydraulic fluid trapped within the cylinder 82 will hold the shelf structure 81 in uppermost position.

When it is desired to lower the shelf structure 81, switch 123 is closed in a manner to be hereinafter described to complete a circuit to the solenoid 108 through normally closed switch 125. Thereupon the armature 107 of the valve 105 is drawn to the left as viewed in FIG. 21 and the fluid stored in cylinder 82 is permitted to drain through return line 114 to the hydraulic fluid reservoir 151. A throttling speed control valve 152 is desirably provided in line 114 to adjust the rate of descent of the shelf structure 81. As soon as the shelf structure reaches its bottommost position, cam 150 will engage the actuator of lower limit switch 125 to open the circuit to solenoid 103 and permit the springs 112 to restore the valve spools to neutral position as shown in FIG. 21. The circuit is thereupon again in readiness for elevating the shelf structure 81 to uppermost position by closing contactor 137.

While the details of the hydraulic and electrical mechanism aforesaid may be varied to accommodate any specific situation, I find that oil is the most suitable hydraulic fluid inasmuch as it will not freeze in cold weather. Moderate hydraulic pressures of about 750 p.s.i. are quite adequate to supply sufficient pressure to the hydraulic motors in which the cylinders and pistons are made in reasonably small sizes to easily fit within the cabinet structure. The weight of each shelf structure 81 and its contents will not ordinarily exceed 150–200 pounds. Accordingly, the cylinders and pistons may be fabricated in sizes measured in fractions of an inch, adequate lifting pressures being nevertheless provided.

Figure 8:
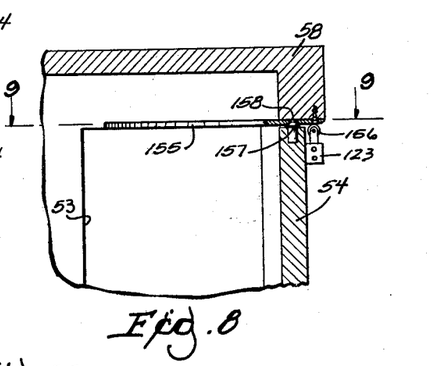
FIG. 8 is a fragmentary cross section taken through the junction of a swinging door and the frame of a cabinet embodying my invention, the section being indicated as line 8—8 of FIG. 10.
Figure 9:
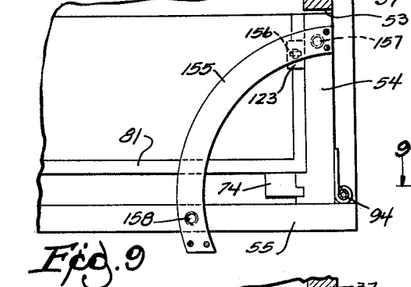
FIG. 9 is a horizontal cross sectional view taken through the device of FIG. 8, with the door in closed position.
Figure 10:
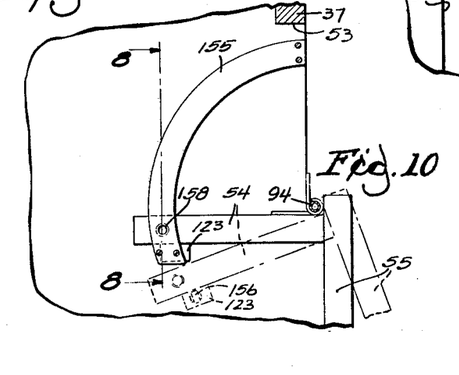
FIG. 10 is a view similar to FIG. 9 in which the door is swung to open position.

While the specific means for actuating switch 123 is variable, I prefer to dispose this switch in such a way that by simply opening door 55 slightly beyond its 90° open position the switch will be actuated to cause the shelf structure 81 to automatically descend. The preferred arrangement is illustrated in FIGS. 8, 9 and 10. The top 58 of the cabinet may be provided with an arcuate track 155, switch 123 being mounted on side wall 54 of the door and having the roller of its actuator 156 engaged with the undersurface of track 155 to hold switch 123 open until such time as the door 55 has been swung to its position shown in dotted lines in FIG. 10 in which the actuator roller has moved beyond track 155, thereupon permitting switch 123 to snap to normally closed position, thus automatically starting the power cycle for the down movement of the shelf structure 81.

I may also provide the door side 54 with a spring pressed ball 157, the track 155 being provided with a socket 158 in which the ball may seat to impositively hold the door in its 90° open position. However, further movement of the door beyond its 90° open position and to its dotted line position shown in FIG. 10 will disengage spring pressed ball detent 157 from socket 158 and permit further pivotal movement of the door until switch 123 is actuated.

To preclude inadvertent closure of doors 55 prior to the complete elevation of shelf structure 81, I may provide the top 159 of doors 55 with a gravity biased latch 160 pivoted on pin 161 which spans a slot 162 formed in the door top 159, as best shown in FIG. 2. Accordingly, unless latch 160 is kept level by reason of the upward pressure of top shelf 78 of shelf structure 81, the lightweight end 163 of the latch 160 will project upwardly to engage cabinet top 58 and preclude pivotal movement of door 55 to closed position. However, if the shelf structure 81 is completely raised the top shelf 78 will engage the weighted end of latch 160 to restore it to its dotted line position shown at 166 in FIG. 2, thus retracting the latch from obstructing closing movement of the door.

The elevator shelves of my invention are not limited to use in the uppermost storage areas of the cabinet. As illustrated at the lower left of the embodiment of the invention shown in FIG. 1, the cabinet door 35 is provided with an elevator shelf structure 167 mounted on the inside face of door panel 168. Door panel 168 has a side wall 169 at right angles thereto, both parts being mounted for concurrent pivotal movement on the forward corner of the cabinet base. Accordingly, side wall 30 of the cabinet base is cut out at 187 to receive side wall 169 of door panel 168 when the door 35 is in its closed position.

Door panel 168 is provided with vertical guide rails 170 to which the rear wall 171 of the elevator shelf structure 167 is slidably connected. Appropriate shelves 172 may be provided on the shelf structure 167. If desired the shelf structure may further comprise side walls 173, 174.

Elevator shelf structure 167 is powered in much the same manner as elevator shelves 81. A hydraulic cylinder 177 is mounted on door 168 and is provided internally with a piston 178 having a connection through piston rod 179 to a bracket 180 connected to the rear wall 171 of the elevator shelf structure. The hydraulic cylinder 177 is pressurized by line 181 connected to a valve 105 of substantially the same construction as previously described, the valve having a pressure line 113 and a relief line 114.

Valve 105 for the cylinder 177 is controlled by the same type of electrical circuit as shown in FIG. 22. The up push button for elevator shelf 167 is illustrated at 182 in FIG. 1. Accordingly, the elevator shelf 167 may be raised and lowered to bring articles on the shelves 172 from a relatively inaccessible lowermost position to a relatively accessible elevated position. The structure of the elevator shelf 167 is made rather rigid and substantial in order to support the relatively heavy weight of an automatic food mixer or the like.

Swinging door 36 for the cabinet base comprises a door panel 185 pivotally mounted on the right front corner of the base. Panel 185 is provided with a side wall 186 integral therewith and which closes the cut-out space 187 in side wall 30 as previously described. The inner face of door panel 185 may be provided with a pegboard lining 184 upon which various household utensils may be hung in the conventional manner. If desired a sideboard 188 and a bottom 189 may be provided.

To the exposed margin of sidewall 186 I pivotally mount on the hinges 190 a pegboard 191 mounted in a swinging frame 192. When parallel to pegboard 184, pegboard 191 is desirably spaced both from pegboard 184 and from the exposed margin 189 of bottom 184. Accordingly, space at both sides of pegboard 191 is provided in which cooking utensils, etc., may be hung from pegboard 191. When the door 36 is swung to its open position in FIG. 1, pegboard 191 may be swung on its pivot 190 to provide access to the utensils mounted on pegboard 184 and which would otherwise be blocked by pegboard 191.

Figure 20:
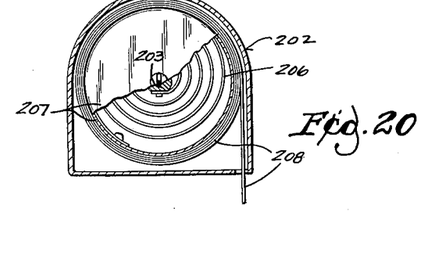
FIG. 20 is a cross sectional view taken through one of the spring powered counterbalance devices of the embodiment of the invention shown in FIG. 15.

In FIGS 15 through 20 a modification of the elevator shelf is illustrated. The door 195 is provided with ways 196 to guide the elevator shelf structure 197 which has shelves 198, a back 199 and sides 200. Near its upper margin the door 195 is provided with an elongated bracket 201 on which are mounted multiple spring wound tape reels 202 and 222. The details of the tape reels are illustrated in FIG. 20, although this structure is conventional and is not part of my invention. Each tape reel comprises a central spring anchor post 203, a clock spring 206, and a tape drum 207 to which the spring 206 and tape 208 are both connected. The spring 206 is sufficiently long to maintain the tape 208 under substantially uniform tension in all positions of the tape with respect to the reel.

At its margin opposite bracket 201, door 195 is provided with a second bracket 209 having a flange 210 with a series of slots 211 formed therein. Rear wall 199 of the elevator shelf structure 197 is provided with a similar bracket 212 having a flange 213 with a like series of slots 214 therein. The slots in one bracket vertically align with the slots in the other bracket. The ends of the respective tapes 208 are provided with terminal anchors 215 having flanges 216 spaced from the ends of the tape and transverse openings 219 proximate said ends.

The tapes 208 of end reels 222 may be permanently attached to rail 213, the tension thereof being calculated to substantially balance the weight of the unloaded shelf structure. However, the tapes 208 of the intermediate reels 202 may be selectively connected to rail 213 or immobilized depending on shelf load.

Figures 15, 16, 17, 18, 19:
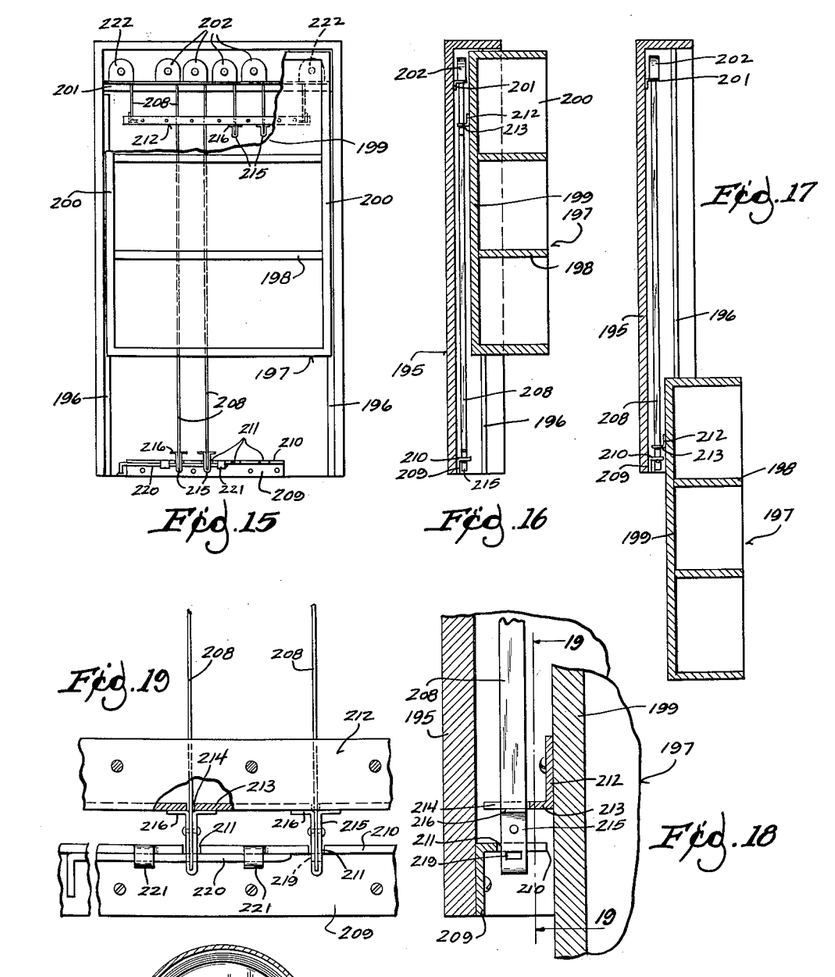
FIG. 15 is a front elevation of a modified movable shelf structure.
FIG. 16 is a vertical cross section through the device shown in FIG. 15, the shelf being shown in raised position.
FIG. 17 is a view similar to that shown in FIG. 16, the shelf being shown in lowermost position.
FIG. 18 is a greatly enlarged cross section through the spring anchor means, the shelf being in lowermost position.
FIG. 19 is a cross sectional view taken along the line 19—19 of FIG. 18.

When the shelf structure 197 is in its lowermost position as illustrated in FIGS. 17, 18 and 19, the ends of the anchors 215 extend through the slots 211 in flange 210 of bracket 209. In this position of the parts certain select reels 202 may be immobilized by selectively advancing the locking rod 220 to engage through one or more of the tape ends 215 through openings 219, as illustrated in FIGS. 15 and 19. The rod 220 may be made long enough to selectively extend through the ends of the tapes of all of reels 202. The rod 220 is desirably guided for reciprocation in the brackets 221 depending from bracket flange 210.

The flanges 216 of the respective anchors 215 which are not immobilized span the slots 214 in the flange 213 and accordingly impose the upwardly directed bias of the springs 206 in the respective tape reels on the flange 213 and thence to the elevator shelf structure 197 to counterbalance the weight of the contents thereof. By selectively immobilizing one or more of the tape reels 202 the aggregate tension of the springs in reels 202 may be imposed upon the elevator shelf, depending upon the weight carried by the shelves.

In FIGS. 11 through 14 I disclose a modified embodiment of the invention particularly adapted for use as shelving in retail mercantile stores, libraries, parts warehouses, etc. In this embodiment of the invention the shelves may extend completely from floor 225 to ceiling 226. In the embodiment illustrated the shelves are disposed along a wall 224, although the shelves may be placed in stacks, back-to-back, or in any desired arrangement.

Figures 11, 12, 13, 14:
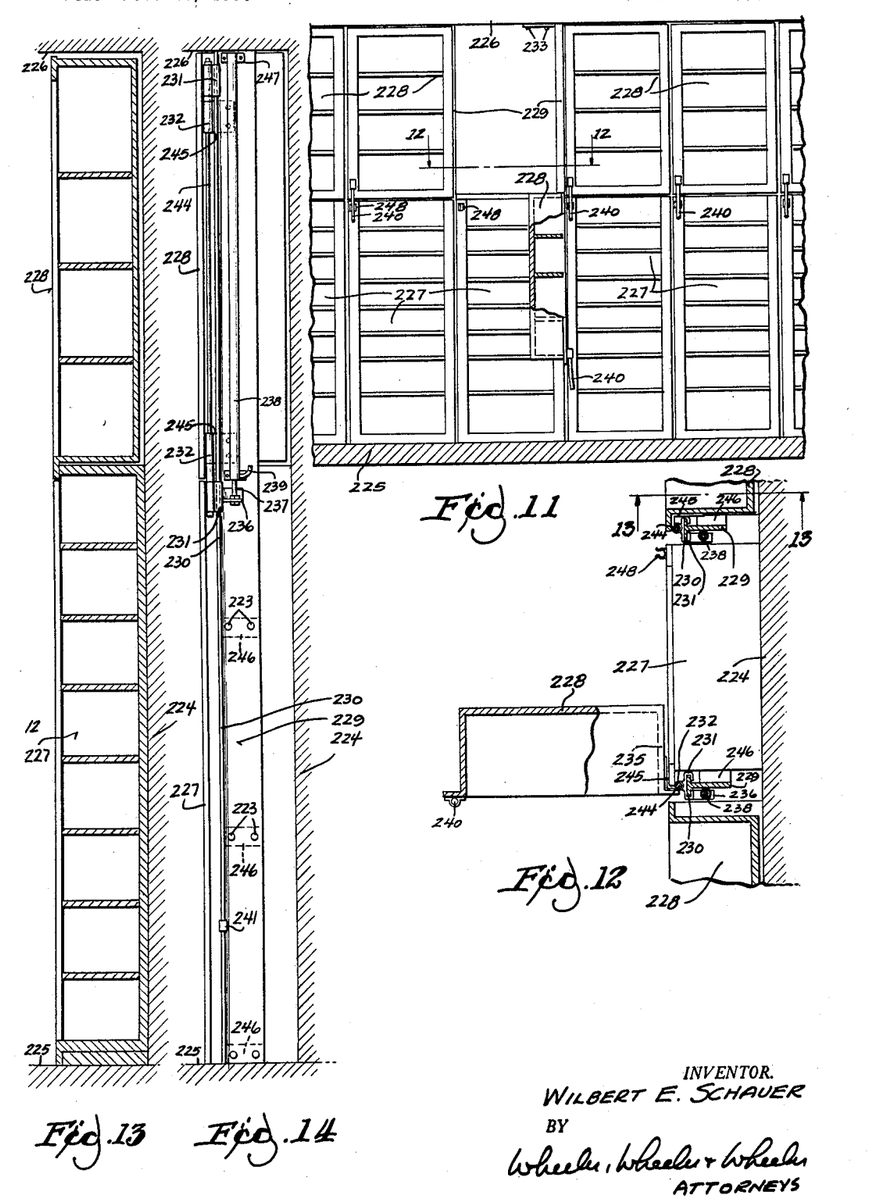
FIG. 11 is a front elevation of a modified embodiment of my invention.
FIG. 12 is a fragmentary cross sectional view taken along the line 12—12 of FIG. 11.
FIG. 13 is a cross sectional view taken along the line 13—13 of FIG. 12.
FIG. 14 is a side elevation of one section of shelves of the device shown in FIG. 11.

The lower relatively accessible portion of the stack comprises bays 227 of relatively fixed shelf sections. The relatively inaccessible space above bays 227, which would otherwise be wasted, is utilized in my invention by provision for movable shelf structures 228. The bays 227 are spaced slightly and intermediate proximate bays 227 I provide a vertical support column comprising a vertical beam 229 connected by bolts 223 through spacers 246 to the side wall of shelf bay 227. The upper end of beam 229 may be anchored to the ceiling 226 by bolts 233 as shown in FIG. 11. Each beam 229 has a track comprising a T-flange 230 embraced by vertically spaced channel brackets 231. The channel brackets or slides 231 are provided with a common hinge pin 244 engaged with the eyes 232 of hinge leaves 245 connected to the side walls 235 of a shelf structure 228. Shelf structure 228 is thus pivotally movable between its positions shown in FIGS. 13 and 12.

Lowermost slide 231 is provided with a bracket 236 to which the piston rod 237 of a piston within the hydraulic cylinder 238 is connected. Cylinder 238 is securely anchored to the beam 229 by brackets 247. Hydraulic pressure is admitted to the cylinder 238 beneath the piston through hydraulic line 239. The details of the hydraulic system and control means therefor are not illustrated as these may be conventional as suggested by FIGS. 21 and 22, suitably modified.

Each elevator shelf structure 228 may be provided near its bottom corner remote from pivot 244 with a depending handle 240 by which the entire elevator shelf structure may be manually swung between its relatively inaccessible stored position in which its is interlodged or nested above the fixed shelf bays 227, and between adjoining movable shelf structures 228, as shown in FIG. 13, and a transient position in which the shelf structure 228 is swung approximately 90° forwardly of its stored position and clear of fixed shelf bays 227 and in position for vertical movement on the track 230. While such vertical movement could be powered manually, suitable counterbalancing springs of the type shown in FIGS. 15 through 20 being provided, I prefer to power actuate the vertical movement of the shelf structure by means of the hydraulic motor 238.

Actuation of suitable control means aforesaid will permit the hydraulic fluid in the cylinder 238 to drain from the cylinder, the weight of the shelf structure 228 and its contents causing the shelf structure to descend on its track 230 until the lowermost slide 231 engages the stop 241 mounted on the track 230 near its bottom. In lowermost position the contents of shelf structure 228 are readily accessible.

To restore the shelf structure 228 to its relatively inaccessible stored position, hydraulic motor 238 is actuated to raise the shelf structure 228 on its track 230. When the shelf structure is fully elevated, it may be manually swung into its stored position internested with the fixed shelves 227 as aforesaid. The fixed shelves 227 may be provided with spring clamps 248 which receive the handles 240 to impositively hold the movable shelves 228 in stored position.

A further advantage in swinging shelf structure 228 forwardly away from the wall 224 is that the movable shelf structure may be provided with fixed opaque or transparent fronts, shelf contents being removed from the exposed rear of the shelves.

In some applications the features shown in FIGS. 15–20 may advantageously be combined with the power operator of FIG. 21. The counterbalancing springs can be set to counterbalance the unloaded weight of the elevator shelf. The power requirement of the hydraulic motors can thus be reduced to handle only the weight of the load on the shelves. If desired the springs can be set to assume some or all of the load weight, thus further reducing hydraulic power requirements.

Where used in the appended claims, the term "shelf" is broadly applicable to any storage fixture or device, such as a compartment, bin, drawer, tray, bar, desk, etc.

I claim:

1. In a storage device of the character described, an elevator shelf structure having a relatively inaccessible storage position, shelf structure support means including a pivot on which the shelf structure may be pivoted on a vertical axis into the space forwardly of said device, said support means further including guide means on which the shelf structure is guided for vertical movement while in said forward position and into relatively accessible position, and mechanism counteracting the weight of the shelf structure substantially throughout its movement.

2. The device of claim 1 in which said storage device further comprises storage means with respect to which said shelf structure is interlodged against vertical movement in its said stored position, said support means constituting means to swing said shelf structure from interlodgment with said storage means to clear said shelf structure for said vertical movement.

3. The device of claim 1 in which said support means further comprises a cabinet door having a face exposed to view when the shelf structure is in inaccessible position and a reverse face on which said shelf structure is mounted and which is exposed when the shelf structure is in accessible position.

4. The device of claim 1 in which said support means further comprises a cabinet door having a face exposed to view when the shelf structure is in inaccessible position and a reverse face on which said shelf structure is mounted and which is exposed when the shelf structure is in accessible position, said storage device having additional storage means disposed rearwardly of the stored position of said shelf to be exposed when said shelf structure is pivoted into said space.

5. In a storage device of the character described, a shelf structure comprising plural shelves interconnected in spaced relation, said shelf structure having a relatively inaccessible storage position, shelf structure support means including a pivot on which the shelf structure may be pivoted into the space forwardly of said device, said support means further including means on which the shelf structure is vertically movable while in said forward position and into relatively accessible position, said support means comprising a fluid operated ram and motion transmitting connections between the ram and shelf structure for the powered operation thereof, said pivot comprising a tube rotatable on its axis, said connections comprising a fluid line having a portion within said tube and substantially coaxial therewith.

6. In a storage cabinet having a rear wall with article storage means projecting forwardly therefrom, a cabinet door having a closed position in which it is spaced from said storage means, a shelf and means mounting said shelf on the inner face of said door in a relatively inaccessible position in which it projects toward said storage means, said mounting means comprising ways on which the shelf is vertically movable with respect to said door, said door having a pivot on which it is swingable from its said closed position to a transient position forwardly of said cabinet to expose said shelf, said ways constituting means on which said shelf is vertically movable while in such transient position to an accessible position, in further combination with a motor and force transmitting connections between said motor and said shelf.

7. The device of claim 6 in which said cabinet has a side wall, said door having a side wall aligned with the cabinet side wall in the closed position of the door, said cabinet side wall being relieved to receive said door side wall in its closed position.

8. In a storage cabinet having a rear wall with article storage means projecting forwardly therefrom, a cabinet door having a closed position in which it is spaced from said storage means, a shelf and means mounting said shelf on the inner face of said door in a relatively inaccessible position in which it projects toward said storage means, said mounting means comprising ways on which the shelf is vertically movable with respect to said door, said door having a pivot on which it is swingable from its said closed position to a transient position forwardly of said cabinet to expose said shelf, said ways constituting means on which said shelf is vertically movable while in such transient position to an accessible position, in further combination with a motor and motion transmitting connections between said motor and said shelf for the powered operation of said shelf on said ways, means for actuating said motor and including a switch and a switch actuator, and means mounting said switch and switch actuator in relative position with respect to the movement of the door about its pivot to actuate the switch when the door has been opened to a predetermined position to automatically energize the motor and move the shelf to said accessible position.

9. In a storage device having relatively fixed storage means and a movable elevator shelf structure, support means for said movable shelf structure on which the movable shelf structure is pivotally movable on a vertical axis between a relatively inaccessible stored position in which it is nested with respect to the fixed storage means and a transient position clear of said storage means, said support means further comprising guideway means on which said shelf structure moves vertically past said fixed storage means from said transient position to an accessible position.

10. In a storage device having relatively fixed storage means and a movable elevator shelf structure, support means for said movable shelf structure on which the movable shelf structure is pivotally movable on a vertical axis between a relatively inaccessible stored position in which it is nested with respect to the fixed storage means and a transient position clear of said storage means, said support means further comprising guideway means on which said shelf structure moves vertically past said fixed storage means from said transient position to an accessible position, a motor and force transmitting connections from said motor to said shelf structure.

11. In a device of the character described, and including a cabinet having a swinging door and a shelf mounted for vertical movement on said door, a fluid motor mounted on said door and means connecting said motor to said shelf for actuating said shelf, a source of fluid pressure remote from said door and a fluid line interconnecting said source and said motor, hinge means connecting said door to said cabinet, said hinge means comprising a hollow tube rotatable about its axis, said line having a portion disposed within said tube.

12. In a device of the character described, the combination with support means having ways and a shelf vertically movable on said ways and with respect to said means, of multiple counterspring means interconnected between said support means and said shelf, and means for inactivating one or more of said countersprings whereby the counterbalancing force of said multiple springs can be adjusted.

13. The combination of a shelf support member having vertically disposed guideways, a shelf member mounted for vertical movement on said guideways, multiple spring-wound weight counterbalancing elements mounted on one of said members, said elements being provided with tension lines adapted for connection with the other member, and means for immobilizing one or more of said elements whereby the aggregate tension of said lines is adjustable to balance the weight of said shelf and any load thereon.

14. The device of claim 13 in which the connection of said lines to said other member comprises a member having slots aligned with the said lines and through which said lines are threaded, the ends of said lines being provided with means spanning said slots to anchor said lines thereto.

15. The device of claim 14 in which the ends of said lines beyond said anchor means are provided wtih coupling means, the member on which the said elements are mounted being provided with retractable means for engaging said couplings to immobilize the lines engaged thereby.

16. The device of claim 15 in which said retractable means comprises a reciprocable rod aligned with said couplings in one relative position of the members.

17. In a storage device of the character described, an elevator shelf structure having a relatively inaccessible storage position, shelf structure support means including an edge and a pivot on which the shelf structure may be pivoted on a vertical axis into the space forwardly of said device, guideway means on which the shelf structure is vertically movable beyond the edge of said support means while in said forward position and into relatively accessible position and mechanism counteracting the weight of the shelf structure substantially throughout its movement.

18. In a storage device having multiple bays of laterally adjacent relatively fixed storage means and movable elevator shelf structures, support means for said movable shelf structures on which said movable shelf structures are pivotally movable on vertical axes between relatively inaccessible stored position interlodged with said fixed storage means against vertical movement and transient position transverse to said stored position and clear of said storage means, said support means further comprising guideway means on which said shelf structures move vertically past said fixed storage means from said transient position to an accessible position.

19. In a storage device of the character described, an elevator shelf structure having a relatively inaccessible storage position, shelf structure support means including a pivot on which the shelf structure may be pivoted on a vertical axis into the space forwardly of said device, said support means further including guide means on which the shelf structure is guided for vertical movement while in said forward position and into relatively accessible position, and spring means for counteracting the weight of the shelf structure while said shelf structure is moving.

20. In a storage device of the character described, an elevator shelf structure having a relatively inaccessible storage position, shelf structure support means including a pivot on which the shelf structure may be pivoted on a vertical axis into the space forwardly of said device, said support means further including guide means on which the shelf structure is guided for vertical movement while in said forward position and into relatively accessible position, and a motor and force transmitting connections between the motor and the shelf structure.

21. The device of claim 20 in which said motor and connections comprise a fluid operated ram.

References Cited in the file of this patent

UNITED STATES PATENTS

| | | |
|---|---|---|
| 359,022 | Marsh | Mar. 8, 1887 |
| 402,377 | Wood | Apr. 30, 1889 |
| 622,195 | Allison | Apr. 4, 1899 |
| 714,206 | Lippincott | Nov. 25, 1902 |
| 888,104 | Lind | May 19, 1908 |
| 1,053,794 | Durrette | Feb. 18, 1913 |
| 1,408,731 | Harris | Mar. 7, 1922 |
| 1,425,259 | Howe | Aug. 8, 1922 |
| 1,454,985 | Tate | May 15, 1923 |
| 1,583,887 | Kilbourn | May 11, 1926 |
| 2,024,436 | Eickmeyer | Dec. 17, 1935 |
| 2,298,790 | Klassen | Oct. 13, 1942 |
| 2,382,354 | Wales | Aug. 14, 1945 |
| 2,429,523 | Murphy | Oct. 21, 1947 |
| 2,445,394 | Giralt | July 20, 1948 |
| 2,710,242 | Chase | June 7, 1955 |